No. 894,289.  
PATENTED JULY 28, 1908.

F. E. SCHUMACHER.  
FRAME AND JOINT FOR SCREENS.  
APPLICATION FILED JAN. 25, 1908.

Witnesses  
H. O. Rastetter  
Sylvia Boron

Inventor  
Frank E. Schumacher

By  
Bond & Miller  
Attorneys

UNITED STATES PATENT OFFICE.

FRANK E. SCHUMACHER, OF HARTVILLE, OHIO.

FRAME AND JOINT FOR SCREENS.

No. 894,289.            Specification of Letters Patent.            Patented July 28, 1908.

Application filed January 25, 1908. Serial No. 412,556.

To all whom it may concern:

Be it known that I, FRANK E. SCHUMACHER, a citizen of the United States, residing at Hartville, in the county of Stark and State of Ohio, have invented a new and useful Frame and Joint for Screens, of which the following is a specification.

My invention relates to improvements in frames and joints for screens, in which a kerf cut into one of the sides of the frame is extended through the side of a mortise at the corner and forms a jog in said side, which accomodates a jog in the tenon of the other side of the frame forming the joint, said kerf in the said side also being used for the purpose of applying the screen or netting to the frame as hereinafter described.

It will be understood that in screens for windows it is especially important that the joints in the frame work be strong and of such character as to impart rigidity to the whole structure, because of the numerous strains brought to bear upon the said frame by reason of the handling of the frame in putting the screen in place in the window frame, and in taking it therefrom. This is particularly true in screens of the adjustable type, where the screen may be used in any one of several windows. The jarring of the sash upon the screen when in place, and the strain of the wire netting stretched across the frame, also tend to injure the said frame and are further reasons for the need of rigid construction.

Figure 1:
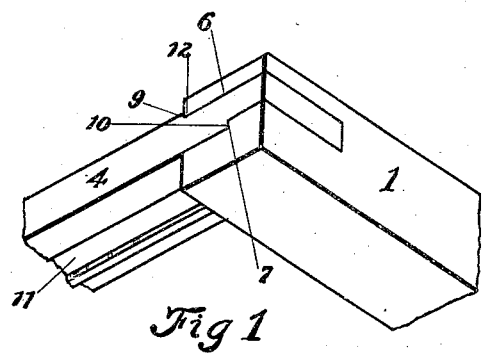
Figure 2:
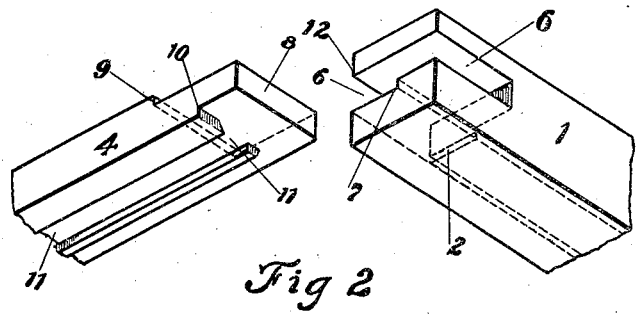
Figure 3:
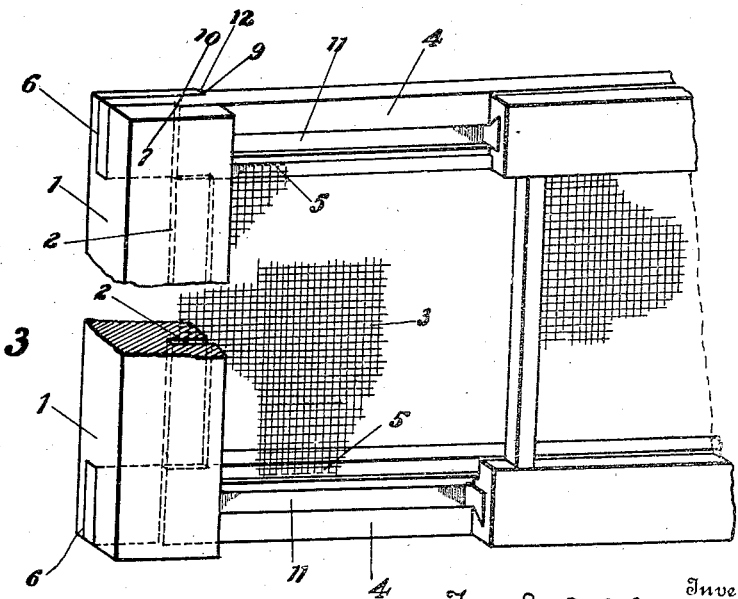

The objects of my improvement are, first, to provide such features in a frame for screens as will facilitate the application of the wire or other netting to said frame in such way that the said netting will be smooth in the frame and fewer fastenings will be needed for the said netting; second, to provide a screen which will be easily made, the same operation or work contributing to both the ease of application of the netting as aforesaid and to the rigidity of the frame when completed; third to provide joints at the corners of the frame of a screen, which will have great strength and will impart rigidity to the whole structure and will withstand the numerous strains brought to bear upon it as above set out. I attain these objects by the construction illustrated in the accompanying drawing, in which, Figure 1 is a view in perspective of the outside of the corner joint assembled. Fig. 2 shows the same parts from the same point of view as in Fig. 1, except that the said parts are disjointed. Fig. 3 is a view in perspective of an adjustable window screen, involving my improvement, said view including a portion of the side piece which is partly cut away, illustrating the way in which the netting is introduced into the kerf.

Similar numerals of reference refer to similar parts throughout the several views.

The side 1 of the frame is provided with a kerf 2 shown in dotted lines in Fig. 2, and more clearly shown upon the broken end of the side 1 in Fig. 3. The said kerf 2 extends along the entire length of the side 1 and contributes to the peculiar formation of the mortise in the said side 1 as hereinafter described as well as providing for the accommodation of the edge of the netting as disclosed in Fig. 3. The netting 3 is attached to the sides 4—4 in any convenient manner such as by tacks at 5. The edge of the netting along the side 1 however is merely let into the kerf 2 and fastenings for said netting at this point are unnecessary. The sides 1 are provided with the mortises 6, said mortises being so located that the kerf 2 in the said side will produce the jog 7 in the side of said mortises, the said jog being of the same depth as the kerf, being in fact a continuation of said kerf through the side of said mortises.

The sides 4 of the frame are provided with the tenon portions 8. The said tenon 8 begins at the jog 9. Upon the opposite side of the said tenon and located between the end of said tenon and its place of beginning is the jog 10.

It should be understood that the groove or rabbet 11 has nothing to do with the present invention being illustrated merely as a part of the particular form of adjustable screen shown in Fig. 3. The construction herein set out is not intended for any particular class or kind of window screens.

Fig. 3 shows one end of an adjustable screen, the said end showing the construction which I wish to secure by Letters Patent, the adjustable feature having nothing whatever to do with the present application. In the assembled joint the tenon on the side 4 enters the mortise in the side 1, the jog 9 abutting against the edge 12 of the side 1 and the jog 10 fitting the jog 7 in the side of the mortise, said jog 7 being formed as above set out by the kerf 2. The mortise and tenon are fastened in any practical and well known manner, and the inter-action of the above mentioned jogs produces a very rigid construction. The wire or other netting is applied and fastened along the edges of the sides 4—4 and the edge of the said netting along the side 1 is introduced into the kerf 2, producing a neat and durable attachment of the netting.

I claim:

1. In a frame and joint for screens, a side provided with a mortise and a kerf, said kerf extending throughout the length of the said side and producing a jog in the said mortise; another side provided with a tenon, said tenon having a jog located between the end of the tenon and its place of beginning and adapted to engage the said jog in the said mortise formed by the said kerf, substantially as and for the purpose specified.

2. In a frame and joint for screens, the combination of two sides provided with one kerf each, the said kerfs extending throughout the length of the said sides and adapted to permit the introduction of the edge of the netting of the screen, the said sides being also provided with mortises so located at the ends thereof as to form with the said kerfs, jogs in the side of the mortises; two other sides provided with tenons and jogs adapted to engage the jogs in the said mortises and adapted to permit the fastening of the netting to the said sides and the said netting so fastened, two edges thereof being located in the kerfs in the two sides, substantially as and for the purpose specified.

3. In a frame and joint for screens, the combination of two sides 1, each provided with the kerfs 2, and mortises 6, the jogs 7 located in the side of said mortises, two sides 4 each provided with the tenon portions 8, the jogs 9 and 10 located thereon and the netting 3 fastened to the sides 4 and let into the kerf 2 in the sides 1, substantially as and for the purpose specified.

4. In a frame and joint of the class described, a side provided with a kerf and a mortise, said kerf extended through the said mortise and forming a jog in the side thereof, a side provided with a tenon, said tenon having a jog therein, the jog in said tenon fitting against the said jog in the said mortise in the assembled joint, netting attached to the side provided with the tenon, the edge of said netting extending into the said kerf in the other side, substantially as and for the purpose specified.

In testimony that I claim the above, I have hereunto subscribed my name in the presence of two witnesses.

FRANK E. SCHUMACHER.

Witnesses:
VERNON MILLER,
H. ERNEST SHOEMAKER.